Patented July 28, 1931

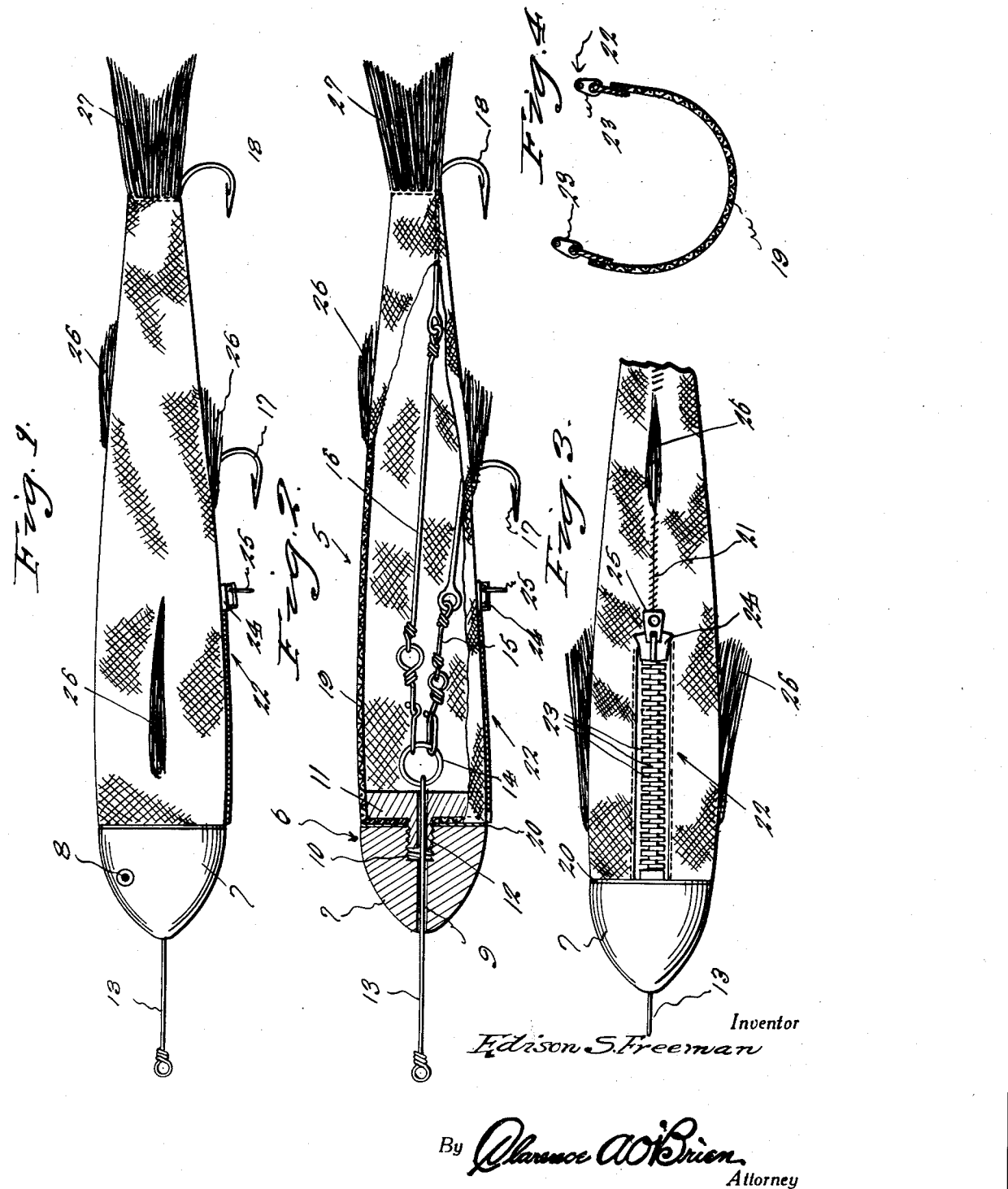

1,816,725

UNITED STATES PATENT OFFICE

EDISON S. FREEMAN, OF MIAMI, FLORIDA

FISHING LURE

Application filed November 22, 1930. Serial No. 497,496.

This invention relates to an artificial bait which is hereinafter more explicitly referred to as a fishing lure for trolling or casting, and especially adapted for deep sea fishing.

The inventive conception is predicated upon a simple and economical fishing accessory of this classification which, in its preferred embodiment, is characterized by an artificial hollow porous bait concealing body, an imitiation head associated therewith, complemental hooks, and other details which lend individuality of appearance to the completed product.

More explicitly related, the inventive idea is carried into effect through the use of a physical structure including unique and original features and distinguishable from analogous lures in that the body portion of the structure is of a flexible fabric of an absorbent nature constituting a practical container for natural bait, wherein said body is provided with a filler slot to expedite filling and removing of the filler, and an associated quick separable fastener of the so-called "zip" type.

My primary aim is to generally improve upon prior art appurtenances of this general class by providing a practical trolling lure individualized by original features of construction and assembly such as serve to produce a novel contribution to the art, which, it is believed, will supersede similar known devices in actual usage.

Other features and advantages will become more readily apparent from the following description and drawings.

In the drawings:

Figure 1 is a side elevational view of a lure developed in accordance with the present inventive conception.

Figure 2 is a longitudinal sectional and elevational view showing the co-ordination of mechanical details.

Figure 3 is a fragmentary bottom plan view.

Figure 4 is a cross sectional view just back of the head and omitting certain details for clearness.

Referring now to the drawings by distinguishing ordinals, I observe that the body is generally designated by the numeral 5 and is of such shape and configuration as to represent and form an artificial fish of appropriate proportions. The head is generally indicated by the numeral 6 and is of a composite variety. For example, it includes a major section 7 shaped to resemble the head of a fish and provided with artificial eyes 8. In addition, it is formed with a central passage 9 and a screw-threaded socket 10. Co-operable with this is the subordinate section 11 in the form of a clamping nut having a bored screw-threaded stem 12 tapped into the socket 10.

The bore of the nut 11 and part 7 register with each other to accommodate and permit passage of the primary leader 13 to which the fishing line (not shown) is connected. This leader 13 is provided with a coupling ring 14 with which the supplemental short leaders 15 and 16 are connected.

The last named leaders are provided with suitable hooks 17 and 18 respectively. The body 5 may be of appropriate absorbent fabric. In the experimental devices common lamp wicking 19 has been employed with success. This is shaped to resemble the body of a fish and has its forward end portion brought around and clamped between the nut 11 and an associated interposed retaining washer 20.

Certain portions of the meeting edges of the underside of the body are stitched together as indicated at 21 in Figure 3. That portion of the body adjacent the head is split or opened and provided with a separable track and slide fastener generally denoted by the numeral 22. This fastener is of a conventional type and includes complemental interlocking track elements 23 to accommodate the slide fastener 24 and its retaining element 25. This is the quick-acting or zip type of fastener which permits quick access to be had to the interior of the body for adjusting hooks and placing and removing the bait filler (not shown).

The body may be provided with suitable fins 26 and an appropriate flexible tail 27.

In order that a clear appreciation of the construction and novelty may be had, attention is now invited to the following structural features and accompanying advantages.

*Flexible body.*—This adds a natural and lifelike appearance to the lure. This causes the lure to have a swimming movement when drawn through the water. The body is readily adaptable to imitation fins. Said fins may be made of feathers, hair, cord, or other material and may be placed on the lure wherever desired.

*Hollow body.*—Permits leaders to be carried from the hooks to the line through the interior of the body and hole in the head of the lure, thus adding to the natural appearance of the lure. It may be readily opened to receive pulped fish scrap or other bait to add scent to the lure.

*Porous body.*—The manipulation of the flexible body by the water as the lure is trolled causes the scent to work out into the water through the porous material of which the body is made, thus leaving a scent trial which attracts the fish.

The fishy taste of the lure induces a striking fish to continue to try to eat the lure for some time, or until the fish is hooked.

*Versatility.*—The type of body described is readily adaptable to any type of head such as those of the various wabbling surface baits now on the market, so that any desired movement of the lure may be obtained. Heads of either wood or metal could be used.

The cloth or other material from which the body of the lure could be constructed could be formed of any color or combination of colors desired. Any desired type of hook or arrangement of hooks may be used on this type of lure.

*Efficiency.*—The lure can be used without bait in the porous cavity with an effectiveness fully equal to that of the best artificial trolling lures now on the market. When filled with pulped fish flesh of a suitable kind, its efficiency is considerably increased.

*Non-whirling.*—When properly constructed this lure has little or no tendency to whirl when in motion. This is a decided advantage, because the lure has a more lifelike appearance when not revolving and consequently will get more strikes. Less precautions are required to prevent the line from becoming kinked and ruined.

*Availability of bait.*—It is an easy matter to obtain the sort of fish desired and a simple matter to cut the fish meat and entrails into a pulp for use in the lure.

*Durability.*—Samples of this lure, made of common lamp wicking and tested, showed no damage after being struck by large barracudas.

The "talon" fastener on the under side of the lure permits access to the cavity in the porous cloth body. This fastener does not of necessity need to be a talon fastener as other means of fastening can be readily devised. The body could be made as a sack and an attachment arranged for attaching the body when filled with bait to the head of the lure. In a talon fastener, the fastener should be short and placed forward near the head, the opening being as small as possible, so long as it is sufficient to permit proper filling of the lure with bait.

The lure is kept upright in the water by reason of the weight of the fastener, and the hooks by virtue of their arrangement underneath the lure. If this weight should prove insufficient, additional ballast could be placed in the head of the lure, or otherwise arranged in order to obtain the desired ballast.

One hook placed at the middle or front end of the lure will probably prove to be the most satisfactory. However, the hook arrangement is merely incidental and the hooks may be attached in any desired manner.

The head may be of any desired material. If made of wood or other soft material, it should have metal parts to fasten it together, and the washer should be of metal, with a metal tube placed in the hole to prevent damage to the head by the leader.

I would suggest stamped sheet metal heads as being more desirable and probably cheaper to manufacture. Such construction, without ballast, should be light enough for a surface lure. Additional ballast could be placed in the head in order to obtain any desired weight and keep the lure upright in the water.

The washer may be made of stamped sheet metal and may be made as a part of either or both pieces of the head.

It is though that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A fishing lure of the class described comprising a hollow reticular flexible body shaped to resemble a fish, said body being provided with imitation fins and a tail, and containing natural bait, and a head of imitation character on the lined end of said body, said head being provided with a longitudinal bore, a line lead extending through said bore and into the interior of the body, and additional leaders connected therewith and provided with hooks projecting through the body to the exterior thereof.

2. As a new product of manufacture, a fishing lure of the character described comprising a hollow body provided at one end with a head and adjacent said end with an entrance slot to facilitate application and removal of bait filler, and a quick separable fastener device connected with said entrance slot.

3. As a new product of manufacture, a fishing lure of the character described comprising a hollow body provided at one end with a head and adjacent said end with an entrance slot to facilitate application and removal of bait filler, and a quick separable fastener device connected with said entrance slot, said head being provided with a longitudinal bore constituting a passage, a main leader extending through said bore into the interior of the body, supplemental leaders connected with the inner end of said leader and provided with hooks having their hooked end portions passing through openings in said body, the connecting portions of said leaders being accessible through said entrance slots.

4. A fishing lure comprising an artificial bait including a head, line attaching means connected with said head, and a flexible natural bait container attached to said head.

5. A fishing lure comprising an artificial bait including a head, line attaching means connected with said head, and a flexible natural bait container attached to said head, said bait container being provided near said head with an entrance slot, and quick separable fastening means connected with the edge portion of said slot.

6. A fishing lure of the class described comprising an artificial head including a front section having a longitudinal bore and a counter bore screw-threaded to provide a socket, a centrally apertured nut provided with a centrally apertured screw-threaded stem tapped into said socket, and a bait container having its forward edge portion clamped between the nut and adjacent portions of said head.

In testimony whereof I affix my signature.

EDISON S. FREEMAN.